Figure 1:
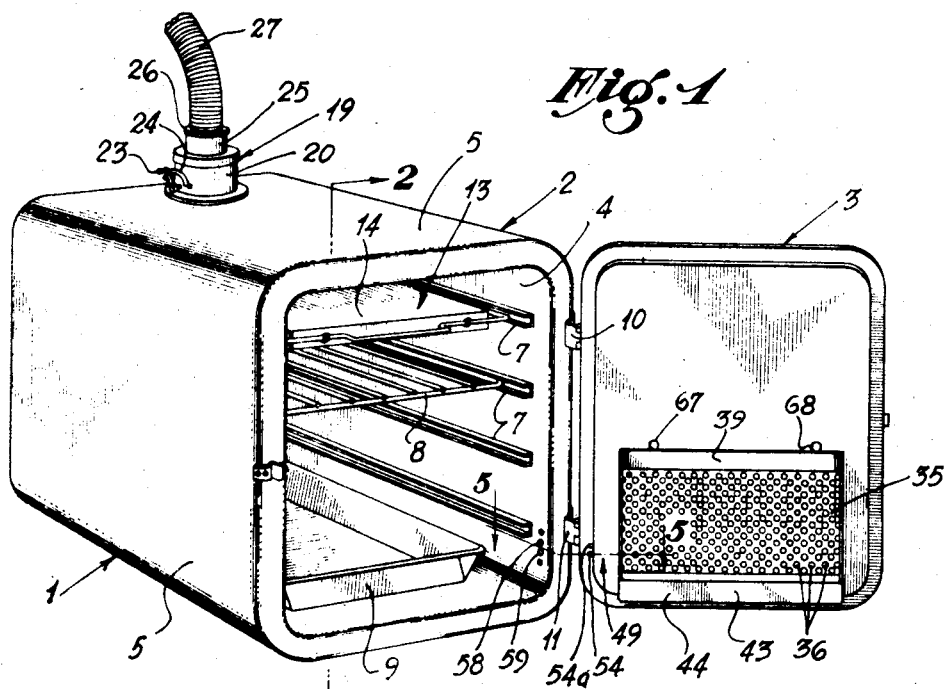

Nov. 18, 1941.　　　　S. ALLER　　　　2,262,910
BROILER
Filed Jan. 14, 1939　　　2 Sheets-Sheet 1

INVENTOR:
SIMEON ALLER;
BY
ATTORNEY.

Nov. 18, 1941.   S. ALLER   2,262,910
BROILER
Filed Jan. 14, 1939   2 Sheets-Sheet 2
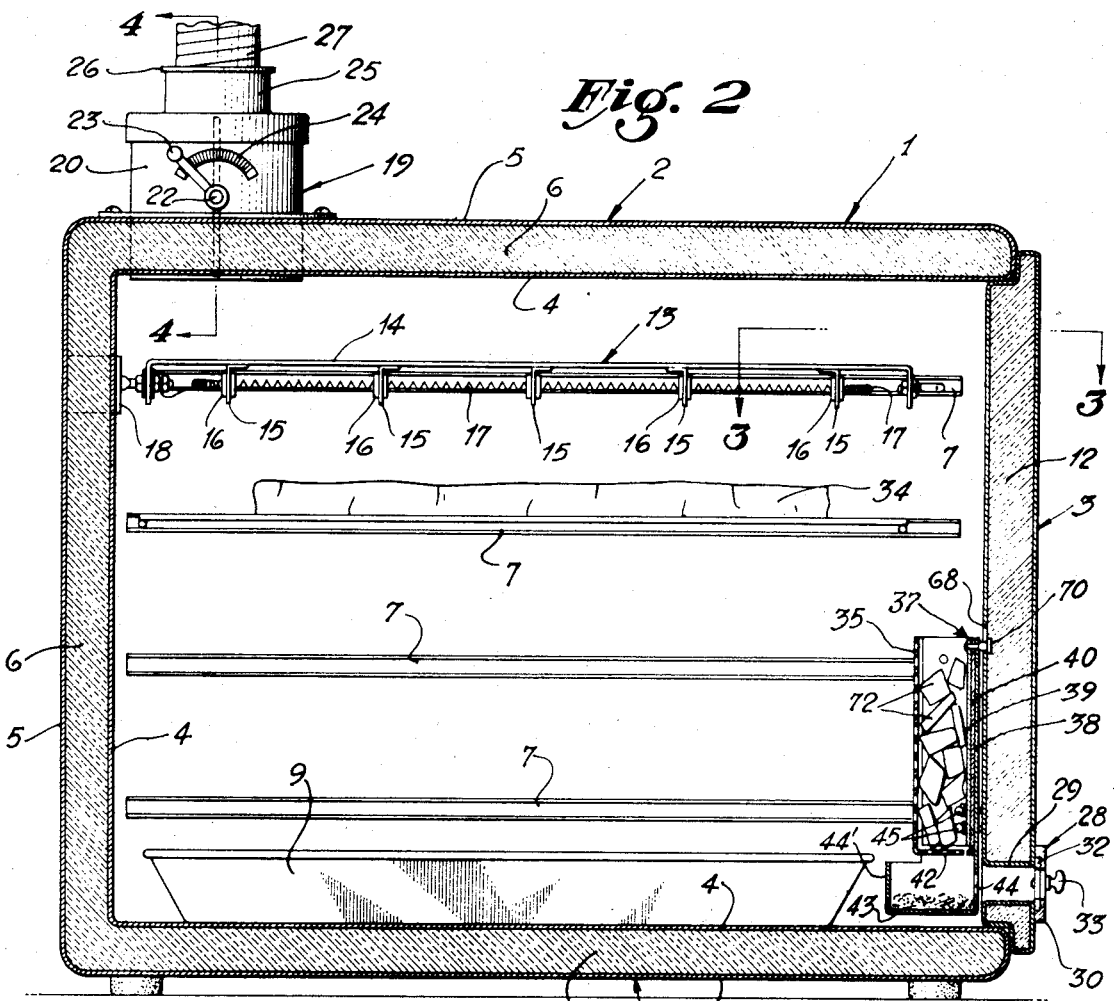
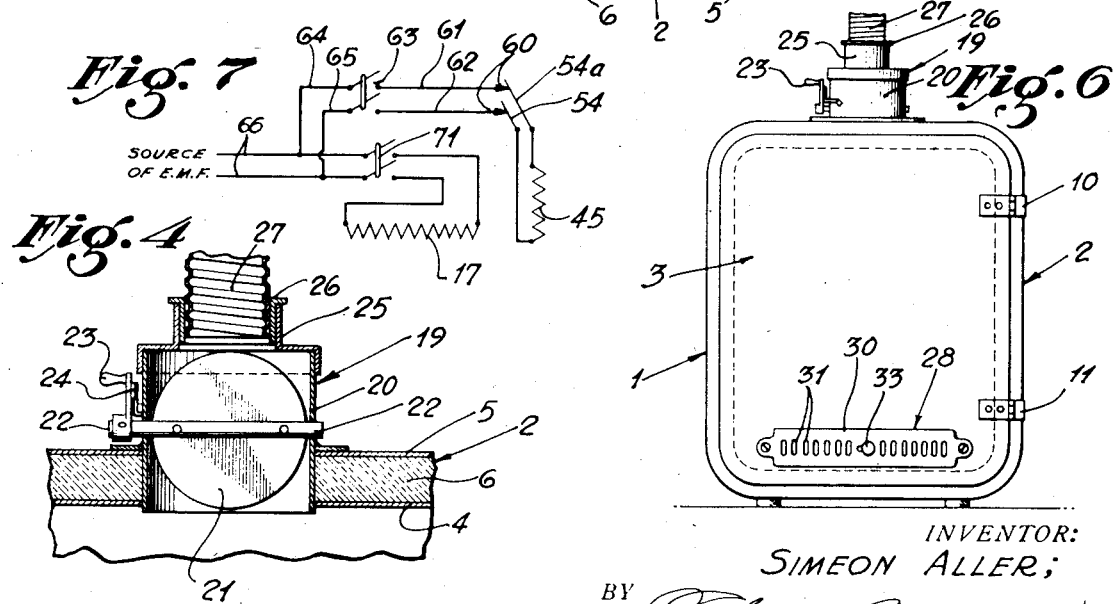
INVENTOR:
SIMEON ALLER;
BY
ATTORNEY.

Patented Nov. 18, 1941

2,262,910

UNITED STATES PATENT OFFICE 2,262,910

BROILER

Simeon Aller, Los Angeles, Calif.

Application January 14, 1939, Serial No. 250,998

1 Claim. (Cl. 219—35)

This invention relates to improvements in broilers of the type which are adapted to broil meats of any character, but particularly steaks, and at the same time to impart a flavor to the steak.

An object of the present invention is the provision of a broiler so constructed as to allow the same to be conveniently placed in a small kitchen to properly flavor a steak or other edible to be broiled and which, during a flavoring and broiling operation, does not permit odor to escape therefrom into the kitchen. The invention is particularly useful in apartment houses where cooking odors are more or less prevalent unless proper ventilation systems are installed. With the present device, it is possible to actually broil an edible on a table, such as a dining room table. The device in the illustration given in the drawings, to be described, is comparatively small and lends itself to portability.

A further object of the invention is the provision of a broiler incorporating suitable means whereby various substances, such as hickory wood or charcoal may be burned in order to smoke any edible within the broiler either during broiling or prior to broiling the said edible, and to conduct said smoke from said broiler to the atmosphere.

Another object is the provision of means adapted to hold substances which are to be burned to smoke any edible within a broiler, which means may be readily cleaned, quickly attached or detached from the interior of the broiler, and is efficient for the purpose intended.

Another object consists in a device which is simple of construction, inexpensive in cost of manufacture, and generally superior to devices wherein an open fireplace is utilized due to the fact that usually open fireplaces are not portable but always must remain in a fixed position.

Another object is the provision of a device which is adapted to smoke meats as efficiently as a large open fireplace is capable of accomplishing and with equal results.

With the above named objects and others in view, the invention consists in the novel and useful provision, formation, construction, association, and relative arrangement of parts, members and features, all as shown in certain embodiments in the accompanying drawings, described generally, and more particularly pointed out in the claim.

Figure 5:
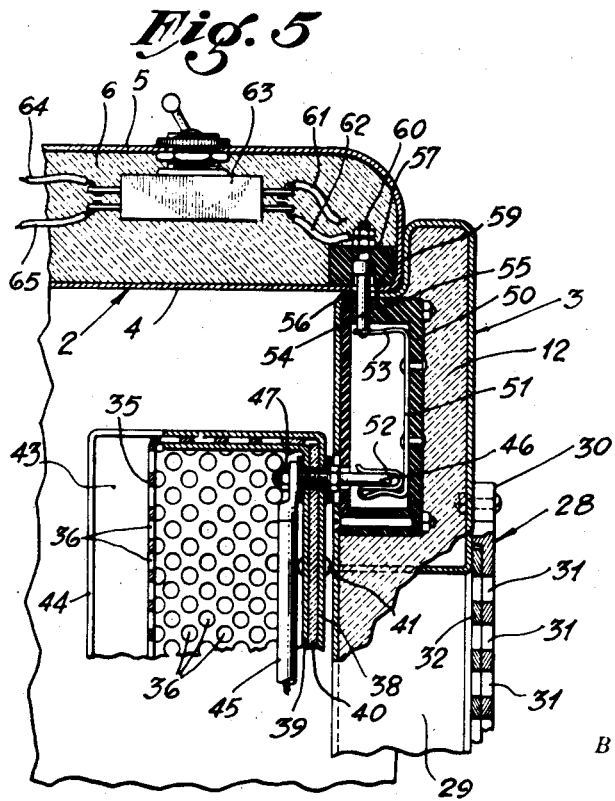
Figure 3:
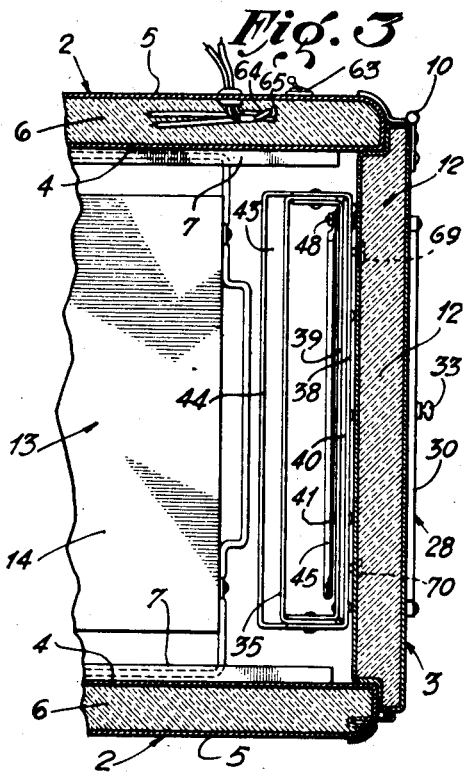

In the drawings:

Figure 1 is a perspective view of my improved broiler, the door being open,

Figure 2 is a sectional view on the line 2—2 of Figure 1, and on an enlarged scale, Figure 3 is a sectional view on the line 3—3 of Figure 2, Figure 4 is a sectional view on the line 4—4 of Figure 2, Figure 5 is an enlarged fragmentary sectional view on the line 5—5 of Figure 1, Figure 6 is a front elevation of the door of the broiler, and Figure 7 is a wiring diagram showing electric circuits which may be utilized in practicing the invention.

Referring now to the drawings, the improved broiler as an entirety is designated by the numeral 1 and includes a casing 2 provided with a closure member in its front wall, such as a door 3. The casing may be of conventional construction, and no particular form is intended nor is it a part of my invention to provide insulation between the inner wall 4 of the casing and its outer wall 5, as illustrated at 6. There is provided the usual slides 7 along side walls of the casing whereby a grill 8 or the like may be positioned between said side walls to hold some edible. A drip pan 9 is adapted to receive juices from the edible during broiling and may be placed in any convenient position within the casing beneath and relatively remote from the edible where the juices may be received without obstruction. The door 3 is hinged at 10 and 11 to the casing, and said door has two walls between which is placed insulation, as shown in Figures 3 and 5, at 12. Further, the door is formed with a rim flange whereby a portion of the door is adapted to be received within the confines of the open end of the casing, with the said rim flange overlapping said end of the casing, as best illustrated in Figure 5.

Within the casing, above the grill 8, is positioned an electric heating means, designated generally by 13. This heating means, as shown in Figures 2 and 3, includes an inverted pan 14 carrying depending spaced brackets 15 adapted to hold insulators 16 between which insulators are secured coiled wires 17. There may be a plurality of coiled wires for the purpose of properly heating the interior of the broiler and for cooking any edible placed therein. In the construction shown, the pan has secured thereto and along its sides a wire frame which may be positioned within two parallel, opposed guides 7. The wires 17 communicate with an outlet socket 18, which socket permits the reception of a plug in turn communicating with a source of electric current supply (see Figure 7).

Secured to the casing and passed therethrough is a vent means for the interior of the broiler casing which is located in the top wall and adjacent the rear wall of the casing. This vent means is designated as an entirely by 19, and the construction of said means is best illustrated in Figures 2 and 4.

Referring to Figure 4, a damper casing 20 is passed through the top wall of the broiler casing and the damper casing is adapted to house a circular disc damper 21 mounted upon a shaft 22, which shaft is journaled in the casing and the outer end of which shaft carries a hand lever 23. This hand lever is adapted to play over a graduated sector 24, the sector projecting beyond the outer wall of the damper casing 20 and adapted to frictionally engage the under surface of the hand lever, whereby the damper disc may be held in any position desired between zero and ninety degrees relative to the axis of the damper casing. A cover 25 is provided for the damper casing and which cover through the medium of means 26 secures an end of flexible tubing 27. This flexible tubing is adapted to be led to the outside atmosphere through a partially open window or a hole for the purpose of passing the tube therethrough to the atmosphere.

The door 3 is provided near its bottom with a damper designated generally as 28. Referring to Figure 2, the door is provided with an elongated slot 29 and externally positioned on the door over this slot is the means 28 including a flanged casing 30 provided with transverse slots 31. An elongated slide 32 is confined between the outer surface of the door and said flanged casing at the zone of the slot 20. This slide is provided with transverse slots which may or may not register with the slots 28 of the casing. An ordinary knob or short lever 33 is provided for moving the slide. The slot 29 is located adjacent the bottom wall of the casing and provides an air access opening diagonally across the casing from the vent means 19.

In the embodiment as just described, it is evident that edibles, such as a steak shown at 34, placed upon the grill 8 and beneath the electric heating element 17 might be broiled. However, in order to give the steak flavor, it may be smoked by the burning of some material, such as hickory. If the hickory burns or smoulders within the broiler, considerable smoke will result, and this smoke will completely envelop the edible and movement of the smoke out of the broiler will depend upon the amount of fresh air admitted within the broiler under regulation of the slide damper of the means 28 and likewise upon regulation of the exhaust or vent means 19.

Novelty is thought to reside in the present invention in the means whereby suitable material may be burned in a broiler for the purpose of flavoring the edible by the generation of smoke.

Adapted to be attached to the inner surface of the door 3 is a perforated casing 35. As will be observed from inspection of Figures 1, 2 and 5, the inwardly facing wall of the casing is completely perforated as are likewise the end walls and bottom wall, as shown at 36. The rear wall 37 of the casing is not plurally perforated. This rear wall is of laminated construction comprising two spaced-apart plates 38 and 39, with insulation 40 interposed therebetween. Suitable means, such as 41, holds the laminations together. The plate 38 is extended below the perforated bottom 42 and bent to form a receptacle designated generally as 43. This receptacle is formed with an elongated slot 44 adapted for juxtaposition to the slot 29 of the door. The receptacle 43 is of greater width than the perforated casing, having its forward flange 44' extended beyond the front perforated face 36. Received within the perforated casing is an electrical igniting and heating element 45, in the present instance in the form of a U-shaped Calrod unit. One end of said Calrod is secured to a pin 46 at 47, and which pin is passed through insulation in the laminated wall and beyond the outer surface thereof. The opposite end of the Calrod unit is similarly arranged and is fastened to a pin 48, which pin projects beyond the outer surface of the plate 38 (see Figure 5).

The door at the zone 49 is recessed inwardly of its inner face and provided with an insulation box 50. This box contains and has secured thereto a spring conductor 51, one end 52 of which is in clip form; the other end 53 is secured to a pin 54 projecting through a transverse opening 55 of the box outwardly through an enlarged opening 56 of the door. In Figure 5, I have illustrated but a single spring conductor. However, there is a duplicate of the spring conductor, together with its clip and pin, connected to said conductor immediately above the showing of Figure 5, as is illustrated in Figure 1, for the other pin at 54ª.

The hinge side of the casing 2 is internally provided with an insulation block 57, formed with a pair of stepped transverse bores in alignment with the respective openings 58 and 59 on the inner surface of said hinge side of the casing. Both openings of the block have secured therein contact screws of like construction, the lowermost one, in Figure 5, being shown at 60. Thus, when the door is closed, the pins 54 and 54ª pass through the openings 58 and 59 and engage the contacts within the block 57. Leads 61 and 62 connect the contacts with a switch 63, and further leads 64 and 65 connect the switch 63 with the line. The inside plate of the door is provided with two spaced-apart keyhole openings 67 and 68, and the plate 38 of the perforated casing is provided with two headed shanks 69 and 70 adapted to enter the openings 67 and 68 to permit detachable engagement of said casing with the door. Sufficient swinging is afforded so that when the said casing 35 is secured to the door in the manner just stated, the pins, such as illustrated at 46 in Figure 5 for one pin, may be received within the insulation box 50 for engagement with the spring clips (one of which is illustrated at 52). When the door is closed and the switch 63 moved to the "on" position, an electrical circuit will be completed through the Calrod 45, and upon opening the door, the circuit is broken automatically. Referring to the diagrammatic wiring view in Figure 7, the main heating element for broiling the edible connects with a switch 71 and said switch 71, together with the switch 63, are joined with leads which are adapted to connect with the outlet socket 18.

The operation, uses and advantages of the invention are as follows:

The casing 35 is adapted to have placed therein such material as may be desired to impart a flavor to an edible within the broiler. Specifically, I may place within said container, chips or small blocks of hickory wood and charcoal, as roughly indicated in Figure 2 at 72. The switch 71 may be left open, in which event when an edible is placed upon the grill 8, such as indicated at 34, said edible will not be broiled. The switches 71 and 63 may be closed, in which event the Calrod at 45 will incandesce and set fire to the chips or the like 72. By properly adjusting the damper in the door, as well as adjusting the damper disc 21 in the top of the broiler casing, a forced draft is created which flows diagonally across the casing, and the smoke from the burning chips will impregnate the air draft and fill the interior of the broiler and envelop the edible, which is disposed within the path of impregnated air, to impart to said edible any desired flavor. After a given period of burning, the ashes will sift through the perforations in the base 42 of the casing and into the receptacle 43.

After the smoking operation is completed, the current may be closed through the heating coil 17 and the steak or other edible will be broiled. As sometimes happens, unless both surfaces of the steak are seared, juices from the steak or other edible will pass through the path of impregnated air and fall into the pan 9 placed beneath the grill. However, it is to be noted that said juices will not contact the casing 35 nor drop upon the shavings, chips, or the like, 72 within said casing, as the space between the grill and pan is entirely unobstructed.

It is a simple matter to clean the casing 35 as it may be readily removed from the door by first pulling straight outwardly adjacent the bottom, to the end that the contact pins disengage the contact clips, followed by an upward movement to release the heads of the shanks from the keyhole slots. The receptacle 43 has caught the ash and such ash as may remain within the casing 35 may be readily disposed of. The device is clean and the ash does not scatter within the broiler, or otherwise dirty the same.

I believe that novelty resides in the provision of a container adapted to hold material to be burned, which container may be detachably secured to a door of a broiler and in such a manner as to be out of the path of any drippings from any edible being broiled.

It is evident that a device of this character is sanitary and may be given a pleasing appearance by providing the interior of the broiler and the door with a porcelain coating.

In actual practice, I have found that a device of this character may be placed in a very small apartment or room and the flexible tube 27 lead over a considerable distance to a window which is slightly ajar so that the end of the tube may pass to the outside atmosphere. Under these circumstances, it has been found that the broiler will properly cook an edible and without any cooking odor escaping into the room or apartment. Furthermore, the device in its present form, as has been previously pointed out, is portable and may be taken from place to place.

It is obvious that various modifications may be made in the practice of the invention, such as providing a thermostat to regulate the heat of the main burner, together with further refinements, all of which will suggest themselves to anyone skilled in this art without, however, departing from the spirit of the invention as described and as shown in the drawings.

I claim:

A portable broiler having a vent means adjacent the top and a side wall thereof and further having an air entrance means adjacent the bottom and the opposite side wall thereof whereby a path of air is directed diagonally across the broiler, said broiler further having an access opening and a closure member therefor, a perforate container for a burnable flavoring substance adjacent said air entrance means for impregnating said path of air with the products of combustion of said substance when the latter is burned, an igniting and heating unit for said burnable substance, a perforate support for an edible disposed within the path of impregnated air, a heating element adjacent said support but on the opposite side thereof from said container for applying a broiling heat to the edible carried by the support, a drip pan disposed on the opposite side of said support from the heating element and located below said path of impregnated air for collecting drippings from the edible after the drippings pass without obstruction through the path of impregnated air, and means automatically operable upon opening of the closure member for decreasing the energization of the igniting and heating unit.

SIMEON ALLER.